United States Patent
Chao

(10) Patent No.: US 12,154,316 B2
(45) Date of Patent: Nov. 26, 2024

(54) FABRIC INFORMATION DIGITIZATION SYSTEM AND METHOD THEREOF

(71) Applicant: Frontier.cool Inc., Taipei (TW)

(72) Inventor: Chun-Pu Chao, Taipei (TW)

(73) Assignee: Frontier.cool Inc., Taipei (TW)

(*) Notice: Subject to any disclaimer, the term of this patent is extended or adjusted under 35 U.S.C. 154(b) by 436 days.

(21) Appl. No.: 17/572,656

(22) Filed: Jan. 11, 2022

(65) Prior Publication Data

US 2022/0292810 A1    Sep. 15, 2022

Related U.S. Application Data

(60) Provisional application No. 63/160,006, filed on Mar. 12, 2021.

(30) Foreign Application Priority Data

Nov. 29, 2021  (TW) ................................ 110144449

(51) Int. Cl.
*G06V 10/764* (2022.01)
*G06F 30/27* (2020.01)
(Continued)

(52) U.S. Cl.
CPC .......... *G06V 10/764* (2022.01); *G06F 30/27* (2020.01); *G06N 3/08* (2013.01); *G06T 7/40* (2013.01);
(Continued)

(58) Field of Classification Search
CPC ...... G06V 10/764; G06V 10/82; G06V 30/10; G06V 10/56; G06V 20/60; G06T 7/40;
(Continued)

(56) References Cited

U.S. PATENT DOCUMENTS 5,255,352 A * 10/1993 Falk ....................... G06T 15/04
                                                          345/582
5,751,834 A *  5/1998 Lisk, Jr. ................... G06T 7/44
                                                          382/168
(Continued)

FOREIGN PATENT DOCUMENTS

CN        109410310           3/2019
CN        109410310  A    *  3/2019
(Continued)

OTHER PUBLICATIONS

Li et al., "Automatic woven fabric classification based on support vector machine," International Conference on Automatic Control and Artificial Intelligence (ACAI 2012), Xiamen, 2012, pp. 581-584, doi: 10.1049/cp.2012.1046. (Year: 2012).*

(Continued)

*Primary Examiner* — Amandeep Saini
*Assistant Examiner* — Daniella M. DiGuglielmo
(74) *Attorney, Agent, or Firm* — JCIPRNET

(57) ABSTRACT

A fabric information digitization system and a fabric information digitization method are provided. The fabric information digitization system includes an image capturing apparatus and a computing apparatus. The image capturing apparatus obtains a fabric image. The computing apparatus includes an image processing module. The computing apparatus executes the image processing module to analyze the fabric image to obtain fabric classification information. The computing apparatus inputs the fabric image to one of a plurality of neural network modules corresponding to different fabric classifications in the image processing module according to the fabric classification information to generate a normal map and a roughness map. The computing apparatus integrates the fabric classification information, the normal map, and the roughness map to generate a fabric file.

18 Claims, 4 Drawing Sheets

(51) Int. Cl.
  *G06N 3/08* (2023.01)
  *G06T 7/00* (2017.01)
  *G06T 7/40* (2017.01)
  *G06T 7/90* (2017.01)
  *G06V 10/56* (2022.01)
  *G06V 10/82* (2022.01)
  *G06V 20/60* (2022.01)
  *G06V 30/10* (2022.01)
  *G06F 113/12* (2020.01)

(52) U.S. Cl.
  CPC ............... *G06T 7/90* (2017.01); *G06V 10/82* (2022.01); *G06V 30/10* (2022.01); *G06F 2113/12* (2020.01); *G06T 7/0002* (2013.01); *G06T 2207/10008* (2013.01); *G06T 2207/20081* (2013.01); *G06T 2207/20084* (2013.01); *G06T 2207/30124* (2013.01); *G06V 10/56* (2022.01); *G06V 20/60* (2022.01)

(58) Field of Classification Search
  CPC ............. G06T 7/90; G06T 2207/10008; G06T 2207/20084; G06T 2207/30124; G06T 7/0002; G06T 2207/20081; G06F 30/27; G06F 2113/12; G06N 3/08
  See application file for complete search history.

(56) References Cited

U.S. PATENT DOCUMENTS

2005/0094853 A1* 5/2005 Kang ................. G01N 21/8901
  382/154
2018/0314905 A1* 11/2018 Enami ................... G06V 10/245
2019/0125015 A1  5/2019 Schultz et al.
2019/0347526 A1* 11/2019 Sunkavalli ............. G06N 3/084

FOREIGN PATENT DOCUMENTS

| CN | 111008930 | 4/2020 |
| CN | 113743525 | 12/2021 |
| TW | 201418544 | 5/2014 |
| TW | M579762 | 6/2019 |

OTHER PUBLICATIONS

Xiao et al., "Automatic Recognition of Woven Fabric Pattern Based on TILT," Mathematical Problems in Engineering, vol. 2018, Article ID 9707104, pp. 1-12, 2018, https://doi.org/10.1155/2018/9707104. (Year: 2018).*

Muhammad Ather Iqbal Hussain et al., "Woven Fabric Pattern Recognition and Classification Based on Deep Convolutional Neural Networks", Electronics, Jun. 24, 2020, p. 1-p. 12, vol. 9.

A.A.M. Kuijpers (Amfi) et al., "Digital Fabric Roadmap—International Apparel Federation", Mar. 3, 2021, p. 1-p. 26, Available at: https://www.iafnet.com/2016_01_22/wp-content/uploads/2021/04/Digital-Fabric-Roadmap-DFR-whitepaper-2021-AMFI-IAF-Modint-powered-by-ClickNL.pdf.

"Written Opinion and Search Report of Singapore Counterpart Application", issued on Jan. 16, 2023, p. 1-p. 9.

"Office Action of Taiwan Counterpart Application", issued on Jul. 12, 2022, p. 1-p. 7.

"Office Action of U.K. Counterpart Application", issued on Jul. 26, 2022, p. 1-p. 5.

* cited by examiner

FABRIC INFORMATION DIGITIZATION SYSTEM AND METHOD THEREOF

CROSS-REFERENCE TO RELATED APPLICATION

This application claims the priority benefit of U.S. Provisional Application No. 63/160,006, filed on Mar. 12, 2021 and Taiwan Application No. 110144449, filed on Nov. 29, 2021. The entirety of each of the above-mentioned patent applications is hereby incorporated by reference herein and made a part of this specification.

BACKGROUND

Technical Field

The disclosure relates to an information digitalization technology, and in particular, relates to a fabric information digitization system and method thereof.

Description of Related Art

At present, the digitization of the textile industry has become a major trend in the global industry. However, how to efficiently transform physical fabric information into digital fabric data to facilitate subsequent applications in the textile industry is a bottleneck in the digitalization of the textile industry. Currently, acquisition of digital information of physical fabrics requires a large number of and even expensive measurement apparatuses and professional measurement personnel to capture the images of the physical fabrics. Further, the measurement of the related fabric specification parameters is performed manually, as such, the physical fabric information may not be efficiently transformed into digital fabric data.

Further, regarding the aforementioned acquisition of digital information of the physical fabrics, only simple two-dimensional images and simple fabric specifications are obtained most of the time, so excessively low actual application benefits are provided. Moreover, expensive measurement apparatuses and hiring of professional measurement personnel are not affordable to most of textile manufacturers. Therefore, the fabric digitization in the textile industry has not been effectively popularized, resulting in a slow digitization process in the textile industry.

SUMMARY

Accordingly, the disclosure provides a fabric information digitization system and method thereof capable of rapidly and conveniently obtaining digitalized fabric information through image analysis and facilitating file creation of fabric digital information.

The disclosure provides a fabric information digitization system including an image capturing apparatus and a computing apparatus. The image capturing apparatus obtains a fabric image. The computing apparatus is coupled to the image capturing apparatus and includes an image processing module. The computing apparatus executes the image processing module to analyze the fabric image to obtain fabric classification information. The computing apparatus inputs the fabric image to one of a plurality of neural network modules corresponding to different fabric classifications in the image processing module according to the fabric classification information to generate a normal map and a roughness map. The computing apparatus integrates the fabric classification information, the normal map, and the roughness map to generate a fabric file.

The disclosure further provides a fabric information digitization method, and the method includes the following steps. An image capturing apparatus obtains a fabric image. A computing apparatus executes an image processing module to analyze the fabric image to obtain fabric classification information. The computing apparatus inputs the fabric image to one of a plurality of neural network modules corresponding to different fabric classifications according to the fabric classification information to generate a normal map and a roughness map. Further, the computing apparatus integrates the fabric classification information, the normal map, and the roughness map to generate a fabric file.

To sum up, in the fabric information digitization system and method thereof provided by the disclosure, by analyzing the fabric image, multiple pieces of digitalized fabric information and fabric map images may be rapidly obtained, files are created, and file creation of the fabric digitalization information is therefore rapidly and conveniently implemented.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
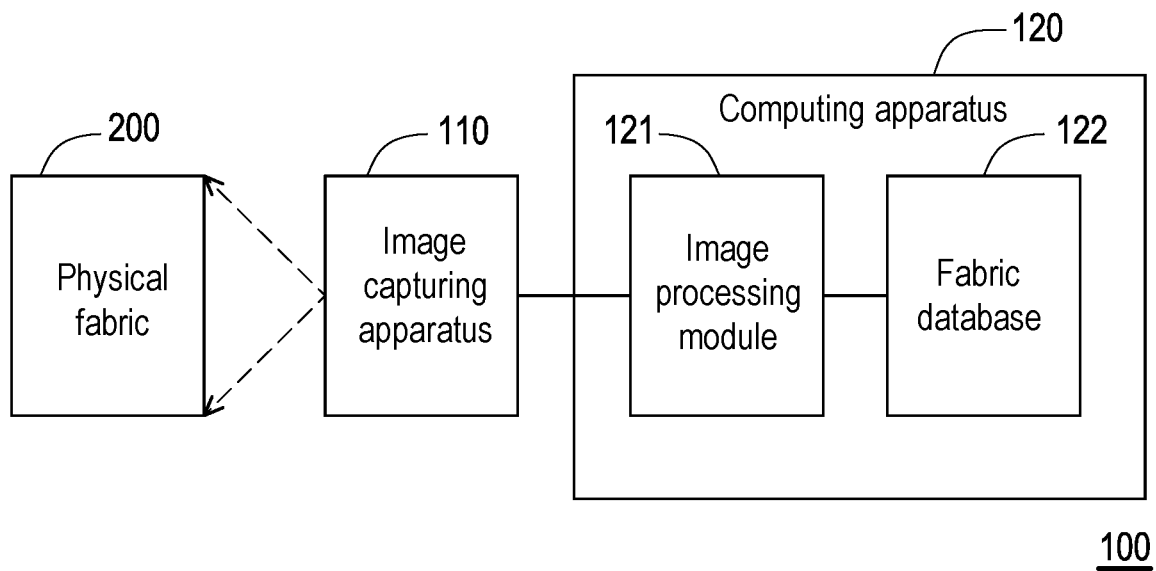
FIG. 1 is a schematic view of a fabric information digitization system according to an embodiment of the disclosure.

In order to make this disclosure more comprehensible, several embodiments are described below as examples of implementation of the disclosure. Moreover, elements/components/steps with the same reference numerals are used to represent the same or similar parts in the drawings and embodiments.

FIG. 1 is a schematic view of a fabric information digitization system according to an embodiment of the disclosure. With reference to FIG. 1, a fabric information digitization system 100 includes an image capturing apparatus 110 and a computing apparatus 120. The computing apparatus 120 includes an image processing module 121 and a fabric database 122. The image capturing apparatus 110 is coupled to the computing apparatus 120. The image capturing apparatus 110 may be connected to the computing apparatus 120 through wired or wireless communication and may transmit data to the computing apparatus 120. In this embodiment, the computing apparatus 120 may include a processor and a memory, and the memory may store the image processing module 121, the fabric database 122, image data, and data such as a related algorithm or other modules for being accessed and executed by the processor.

In this embodiment, the image capturing apparatus 110 may be, for example, a flatbed scanner, a smart mobile device (e.g., a mobile phone or a tablet, etc.), or other types of scanning apparatuses. Note that the image capturing apparatus 110 may be equipped with an image scanning or image shooting function to directly obtain a fabric image. Alternative, the image capturing apparatus 110 may receive a fabric image from a scanning apparatus or an electronic device equipped with an image scanning or image shooting function to indirectly obtain the fabric image. In this embodiment, the image capturing apparatus 110 may transmit the fabric image to the computing apparatus 120, and that the computing apparatus 120 analyzes the fabric image through the image processing module 121. Note that the fabric image obtained by the image capturing apparatus 110 may be a two-dimensional image. The image processing module 121 may automatically analyze the fabric image to obtain a plurality of pieces of corresponding fabric information. In this embodiment, the computing apparatus 120 may integrate these pieces of fabric information to create a corresponding fabric file. The computing apparatus 120 may directly store the fabric file to the fabric database 122 or may perform a data conversion operation and/or a data compression operation on the fabric file first and then stores the converted fabric file into the fabric database 122 to complete the automatic file creation operation.

In the this embodiment, the processor may be, for example, a central processing unit (CPU), a graphic process unit (GPU), or a programmable microprocessor for general or special use, a digital signal processor (DSP), a programmable controller, an application specific integrated circuit (ASIC), a programmable logic device (PLD), other similar processing devices, or a combination of the foregoing devices. The memory may be, for example, a dynamic random access memory (DRAM), a flash memory, or a non-volatile random access memory (NVRAM), and the like.

Figure 2:
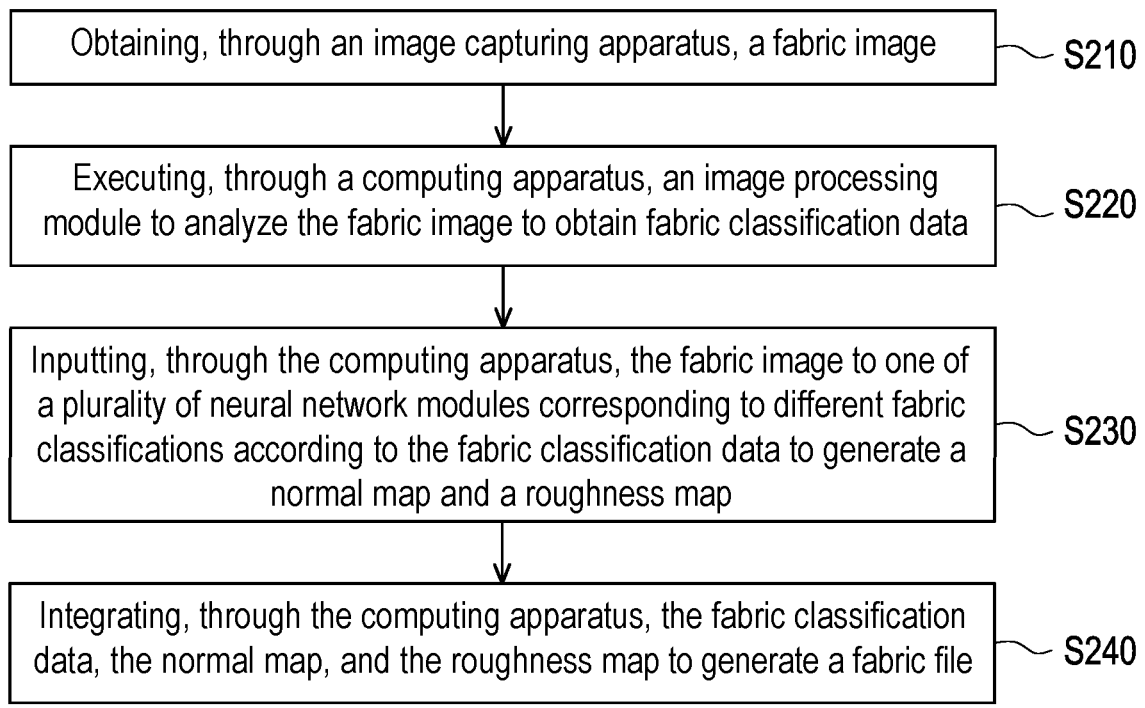
FIG. 2 is a flow chart of a fabric information digitization method according to an embodiment of the disclosure.

FIG. 2 is a flow chart of a fabric information digitization method according to an embodiment of the disclosure. With reference to FIG. 1 and FIG. 2, the fabric information digitization system 100 may execute steps S210 to S240 provided as follows to implement fabric information digitization. In this embodiment, a user may operate the image capturing apparatus 110. In step S210, the image capturing apparatus 110 obtains a fabric image (two-dimensional image). The image capturing apparatus 110 may transmit the fabric image to the computing apparatus 120. In step S220, the computing apparatus 120 executes the image processing module 121 to analyze the fabric image to obtain fabric classification information. In step S230, the computing apparatus 120 inputs the fabric image to one of a plurality of neural network modules corresponding to different fabric classifications in the image processing module 121 according to the fabric classification information to generate a normal map and a roughness map. In step S240, the computing apparatus 120 integrates the fabric classification information, the normal map, and the roughness map to generate a fabric file. In this embodiment, the computing apparatus 120 may integrate the fabric classification information, the normal map, and the roughness map to generate the fabric file and may store the fabric file into the fabric database 122 to complete the file creation operation.

Further, in the fabric information digitization system 100 and the fabric information digitization method provided by this embodiment, the fabric information may be rapidly and effectively digitalized, and further, according to the two-dimensional image of physical fabric, the normal map and the roughness map that may be used for modeling of a three-dimensional model (three-dimensional virtual image) may be automatically generated correspondingly. In the fabric information digitization system 100 and the fabric information digitization method provided by this embodiment, the aforementioned digitalization information and map data may at least be automatically collected for file creation to create the fabric database 122. In addition, details of the steps of this embodiment are described in detail via the following embodiments.

Figure 3:
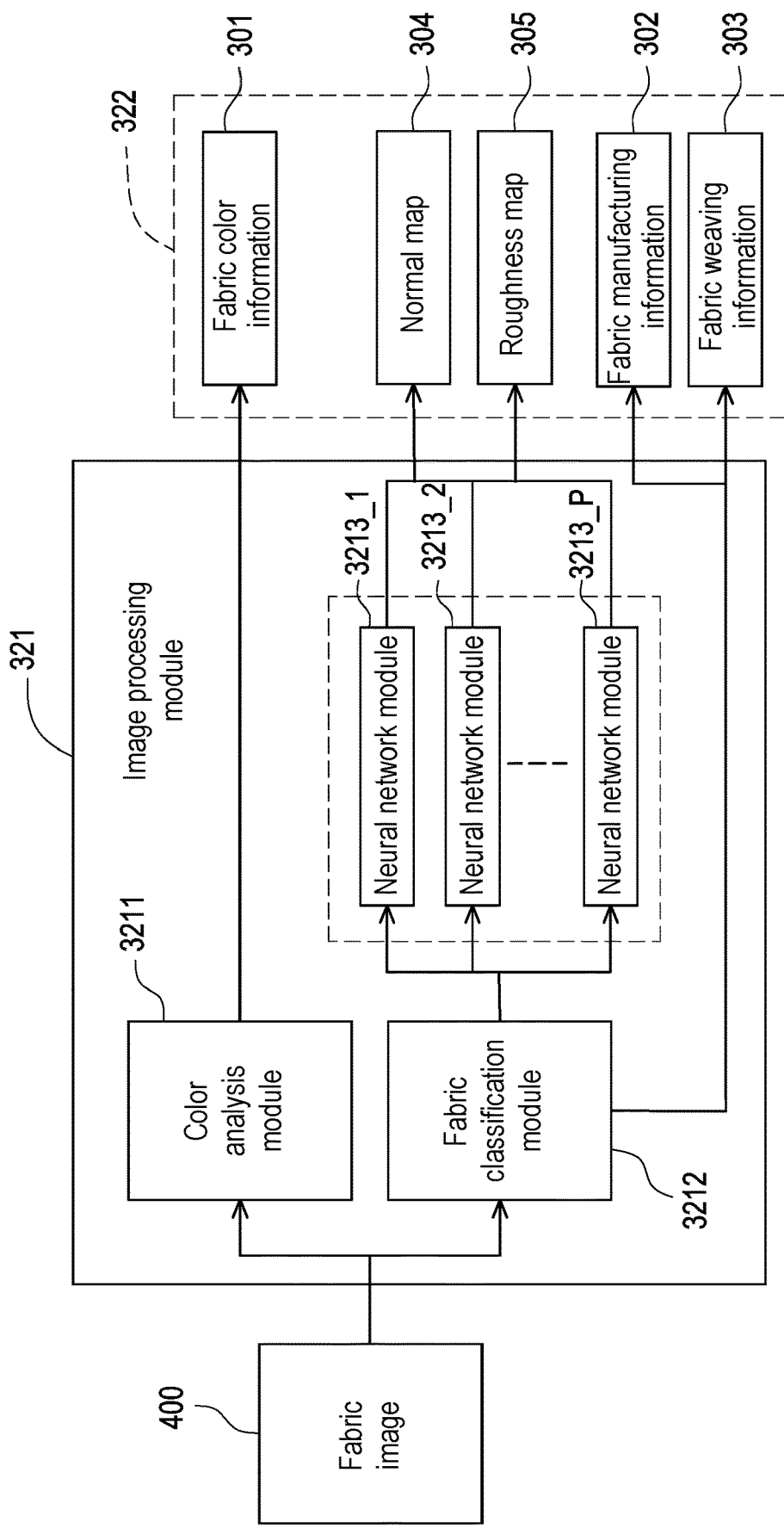
FIG. 3 is a schematic view of an image processing module according to an embodiment of the disclosure.

FIG. 3 is a schematic view of an image processing module according to an embodiment of the disclosure. With reference to FIG. 3, the image processing module in each embodiment of the disclosure may be implemented as a structure of an image processing module 321 shown in FIG. 3. In this embodiment, the image processing module 321 includes a color analysis module 3211, a fabric classification module 3212, and a plurality of neural network modules 3213_1 to 3213_P, where P is a positive integer. The image processing module 321 may input a fabric image 400 to the color analysis module 3211 and the fabric classification module 3212. Note that in an embodiment, before the image processing module 321 inputs the fabric image 400 to the color analysis module 3211 and the fabric classification module 3212, the image processing module 321 may perform an image segmentation operation on the fabric image 400 first to remove a non-fabric part of the image. Further, the image processing module 321 may also perform color correction on a fabric color presented by the fabric image 400. For instance, the image capturing apparatus 110 shown in FIG. 1 may interpret color reading on specific color paper first, and the image processing module 321 may treat a difference between an interpretation result and correct color reading of the specific color paper as a correction parameter and then inputs the correction parameter to a correction algorithm (e.g., matrix calculation with limited interpolation). Therefore, the image processing module 321 may correct a plurality of pixel values of an overall image of the fabric image 400 through this correction algorithm, so that the corrected fabric image 400 may exhibit color performance close to true colors.

In this embodiment, the color analysis module 3211 may analyze the fabric image 400 to generate fabric color information 301. To be specific, the color analysis module 3211 may generate an overall color histogram of the fabric image 400 and determines a color number in the fabric color information of the fabric image 400 according to at least one cluster peak of the overall color histogram. In other words, the color analysis module 3211 may pre-create a plurality of color numbers (cloth color numbers) corresponding to a plurality of colors and a plurality of color combinations first. Next, the color analysis module 3211 may determine at least one main color (or main color distribution) of the fabric image 400 through a calculated result of the pixel values of overall pixels in the fabric image 400 and may search for the corresponding color number according to the at least one main color to be treated as the fabric color information 301.

In this embodiment, the fabric classification module 3212 may analyze the fabric image 400 to obtain fabric classification information, and the fabric classification information may include fabric manufacturing information 302 and fabric weaving information 303. In this embodiment, the fabric manufacturing information 302 may be configured to indicate a fabric manufacturing classification, for example, the fabric is woven fabric, knitted fabric, etc, which is not particularly limited by the disclosure. In this embodiment, the fabric weaving information 303 may be configured to indicate a weaving method of the fabric, for example, poplin weaving, twill weaving, satin weaving, single jersey weaving, Ponte-de-roma weaving, etc, which is not particularly limited by the disclosure. In an embodiment, definition and classification of a fabric manufacturing method and a fabric weaving method may be selectively defined according to different classification needs.

In this embodiments, the neural network modules 3213_1 to 3213_P correspond to different fabric classifications. The neural network modules 3213_1 to 3213_P may be trained separately by using a plurality of sample images corresponding to different fabric manufacturing methods and different fabric weaving methods in advance, so that the corresponding normal maps and roughness maps may be generated. For instance, if the fabric image 400 is determined to be cotton and linen fabric and is made through plain weaving, the image processing module 321 may input the fabric image 400 to the neural network module corresponding to the cotton and linen fabric and the plain weaving, so that this neural network module may correspondingly generate the normal map 304 and the roughness map 305 that may faithfully reflect properties of the corresponding physical fabric.

In this embodiment, the fabric color information 301, the fabric manufacturing information 302, the fabric weaving information 303, the normal map 304, and the roughness map 305 may be integrated into a fabric file 322, and the fabric file 322 may be stored into the fabric database 122 as shown in FIG. 1. The fabric file 322 may further include a corresponding original fabric image 400 stored therein. Besides, in an embodiment, the image processing module 321 may further mark ruler information of the fabric image 400 according to a predetermined image format and may record the ruler information into the fabric file 322. The ruler information may be fabric size data such as a length and width of the fabric, which is not particularly limited by the disclosure. In another embodiment, the image processing module 321 may further recognize a text pattern in the fabric image 400 automatically through natural language understanding (NLU) and semantic understanding to obtain corresponding text information and then records the text information into the fabric file 322. The text information may refer to manufacturer information of a fabric manufacturer, a fabric number or fabric name, etc., which is not particularly limited by the disclosure.

Figure 4:
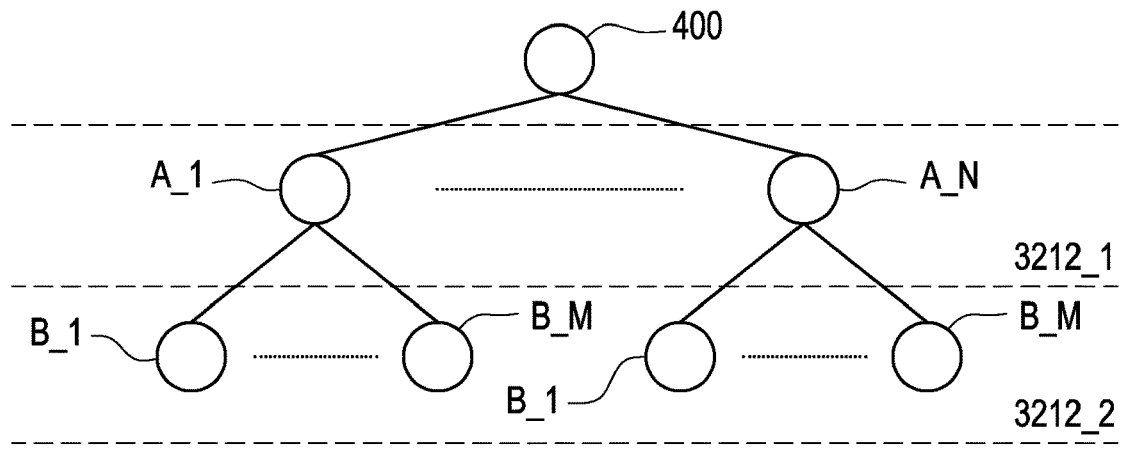
FIG. 4 is a schematic diagram of fabric classification performed by a fabric classification module according to an embodiment of the disclosure.

FIG. 4 is a schematic diagram of fabric classification performed by a fabric classification module according to an embodiment of the disclosure. With reference to FIG. 3 and FIG. 4, in this embodiment, the fabric classification module 3212 may include a support vector machine (SVM) classification model. The support vector machine classification model may be pre-trained to recognize individual image features in a plurality of sample images corresponding to different fabric manufacturing methods and different fabric weaving methods. As shown in FIG. 4, the support vector machine classification model of this embodiment may, for example, implement a two-layer classification stage. A first classification level 3212_1 may, for example, classify the fabric manufacturing methods by distinguishing the appearance of the physical fabric, and a second classification level 3212_2 may, for example, classify the weaving details of the physical fabric. In this regard, when the fabric image 400 is inputted to the fabric classification module 3212, in the first classification layer 3212_1, the fabric classification module 3212 may recognize and classify the fabric manufacturing method of the fabric image 400 first, so as to determine one of fabric manufacturing classifications A_1 to A_N into which the fabric image 400 may be classified and output the corresponding fabric manufacturing information 302, where N is a positive integer. Next, in the second classification layer 3212_1, the fabric classification module 3212 may then recognize and classify the fabric weaving method of the fabric image 400, so as to determine one of fabric weaving classifications B_1 to B_M into which the fabric image 400 may be classified and output the corresponding fabric weaving information 303, where M is a positive integer.

Note that in this embodiment, each of the fabric manufacturing classifications A_1 to A_N may correspond to the same multiple fabric weaving classifications B_1 to B_M, but the disclosure is not limited thereto. In an embodiment, each of the fabric manufacturing classifications A_1 to A_N may correspond to a different fabric weaving classification. However, the fabric classification module 3212 of the disclosure may not be limited to the classification method and the number of classification levels as shown in FIG. 4. In another embodiment, the fabric classification module 3212 may also be implemented by other machine learning models, and the number of classifications and the classification method are not limited.

Figure 5:
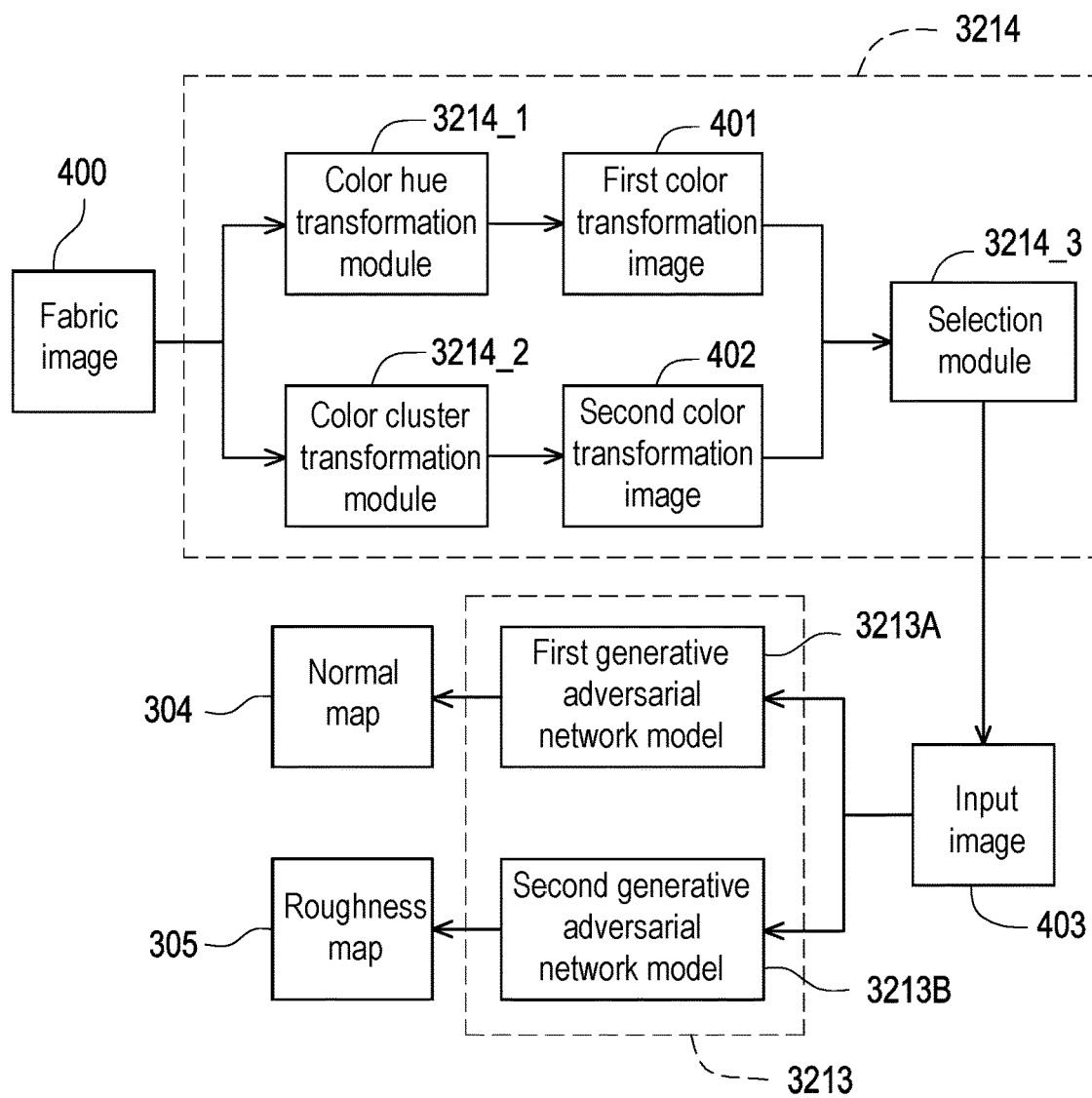
FIG. 5 is a schematic view of generation of a normal map and a roughness map according to an embodiment of the disclosure.

FIG. 5 is a schematic view of generation of a normal map and a roughness map according to an embodiment of the disclosure. With reference to FIG. 3 and FIG. 5, the image processing module 321 may further include an image transformation module 3214 to perform color transformation on the fabric image 400. In this embodiment, the image transformation module 3214 may include a color hue transformation module 3214_1, a color cluster transformation module 3214_2, and a selection module 3214_3. In this embodiment, the color hue transformation module 3214_1 may transform the fabric image 400 to generate a first color transformation image 401. The color cluster transformation module 3214_1 may transform the fabric image 400 to generate a second color transformation image 402. The color hue transformation module 3214_1 and the color cluster transformation module 3214_2 may input the first color transformation image 401 and the second color transformation image 402 to the selection module 3214_3.

To be specific, in order to eliminate color deviation caused by a textile color, the color hue transformation module 3214_1 may convert the fabric image 400 from a red-green-blue (RGB) color space to a hue-saturation-value (HSV) color space. Further, the color hue transformation module 3214_1 may set a hue channel of the color space-transformed image to a single value (that is, the hue value of each pixel of the entire image is adjusted to a single value) and may normalize values of a saturation channel and a lightness channel of the color space-transformed image (that is, the lightness value and the saturation value of each pixel of the entire image are both normalized). In other words, the color hue transformation module 3214_1 may remove a background color in the fabric image 400, so that texture features of the physical fabric may be effectively highlighted, and a following generative adversarial network model may effectively compare and draw an accurate normal map and roughness map.

However, in some cases, when two color patterns in the fabric image 400 have the same hue but different saturation and lightness, the two color patterns cannot be merged after the aforementioned color hue conversion is performed thereon, and therefore, an erroneous image transformation result may be generated. Therefore, the color cluster transformation module 3214_2 may transform the fabric image 400 from the RGB color space to the HSV color space. Further, the color cluster transformation module 3214_2 may perform k-means clustering algorithm calculation on the values of the hue channel, the saturation channel, and the lightness channel of the color space-transformed image to separate different color groups and then normalizes the values of these channels. In other words, the color cluster transformation module 3214_2 may use another method to remove the background color in the fabric image 400, so that the texture features of the physical fabric be effectively highlighted.

In this embodiment, the selection module 3214_3 may to compare two overall color histograms of the first color transformation image 401 and the second color transformation image 402 to select the one with a highest number of cluster peaks and/or a least number of cluster peaks. In other words, the selection module 3214_3 may compare the results of multiple pixel values of the overall pixels after the first color transformation image 401 and the second color transformation image 402 are calculated to determine which has clearer texture or higher resolution image features. Next, the selection module 3214_3 may treat one of the first color transformation image 401 and the second color transformation image 402 selected by the above determination method as an input image 403 and input the input image 403 to a first generative adversarial network model 3213A and a second generative adversarial network model 3213B of a neural network module 3213. In this embodiment, the first generative adversarial network model 3213A may draw and output the normal map 304, and the second generative adversarial network model 3213B may draw and output the roughness map 305.

Note that the neural network module 3213 shown in FIG. 5 may be one of the neural network modules 3213_1 to 3213_P shown in FIG. 3. Note that a plurality of first generative adversarial network models and a plurality of second generative adversarial network models of the neural network module 3213_1 to 3213_P may be trained by using a plurality of sample images corresponding to different fabric manufacturing methods and different fabric weaving methods in advance. In this way, generative networks in the first generative adversarial network models and the second generative adversarial network models may generate different normal maps and different roughness maps corresponding to different fabric manufacturing methods and different fabric weaving methods. Moreover, the normal maps and the roughness maps generated through these generative networks may be outputted through discrimination performed by discriminating networks of both the first generative adversarial network models and the second generative adversarial network models. Therefore, the image processing module 321 provided by the disclosure may automatically generate a light and shadow feature (normal map 304) and a gray-scale feature (roughness map 305) that may faithfully reflect the features of the physical fabric.

Figure 6:
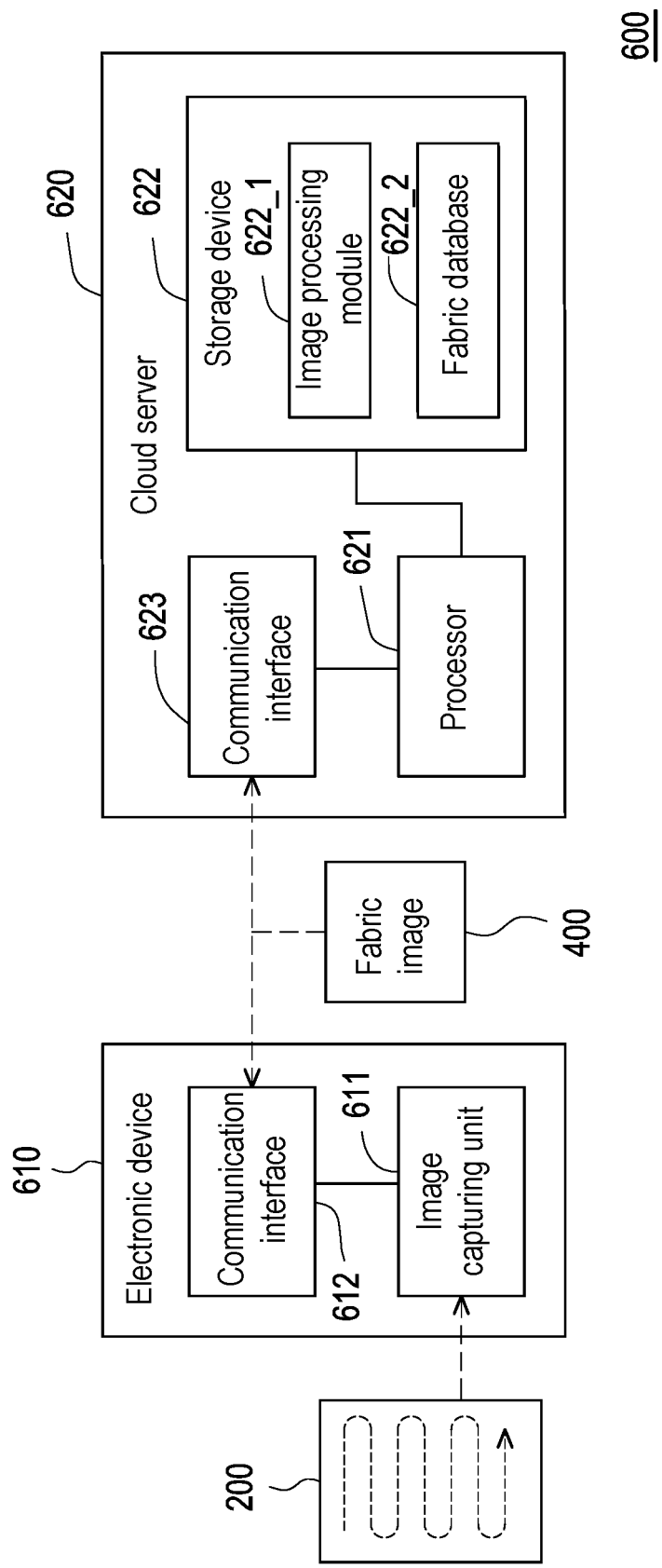
FIG. 6 is a schematic view of a fabric information digitization system according to another embodiment of the disclosure.

FIG. 6 is a schematic view of a fabric information digitization system according to another embodiment of the disclosure. With reference to FIG. 6, a fabric information digitization system 600 includes an electronic device 610 and a cloud server 620. Note that FIG. 6 may be an application example of the embodiment in FIG. 1, so that the image capturing apparatus 110 in the embodiment in FIG. 1 may be implemented as the electronic device 610 in FIG. 6, and the computing apparatus 120 in the embodiment in FIG. 1 may be implemented as the cloud server 620 in FIG. 6. In this embodiment, the electronic device 610 includes an image capturing unit 611 and a communication interface 612. The image capturing unit 611 is coupled to the communication interface 612. The cloud server 620 includes a processor 621, a storage device 622, and a communication interface 623. The processor 621 is coupled to the storage device 622 and the communication interface 623.

In this embodiment, the communication interface 612 and the communication interface 623 may both include wired or wireless communication modules and circuits, and communication types are not particularly limited in the disclosure. In this embodiment, the storage device 622 may store an image processing module 622_1 and a fabric database 622_2. The image processing module 622_1 may be implemented as the image processing module 121 shown the embodiment of FIG. 1. The fabric database 622_2 may be implemented as the fabric database 122 shown in the embodiment of FIG. 1. In this embodiment, the electronic device 610 may be, for example, a flatbed scanner, and the image capturing unit 611 may be, for example, a complementary metal-oxide-semiconductor (CMOS) image sensor (CIS) or a charge coupled device (CCD).

For instance, a user (which may be a textile manufacturer or a person) may place a physical fabric on a flatbed scanner (electronic device 610), so that the image capturing unit 611 may scan a physical fabric 200 to generate a two-dimensional fabric image 400. The flatbed scanner may directly send the fabric image 400 to the cloud server 620 through the communication interface 612. Alternatively, the user may operate, for example, a smartphone to connect to the flatbed scanner (the communication interface 612 of the electronic device 610) to obtain the fabric image 400 and send the fabric image 400 to the cloud server 620. Next, the processor 621 of the cloud server 620 may receive the fabric image 400 through the communication interface 623. The processor 621 of the cloud server 620 may automatically execute the image processing module 622_1 to perform the image analysis and image processing operations provided in the above embodiments to generate a corresponding fabric file. The processor 621 of the cloud server 620 may store the fabric file to the fabric database 622_2, and a file creation operation of digital fabric information is thereby completed. In other words, in the fabric information digitization system 600 provided by the disclosure, a corresponding file including the fabric digital information may be automatically created with only one two-dimensional image. From another point of view, the user may only need to simply operate the flatbed scanner, and the file creation operation of the digitalization information of the fabric may be automatically implemented.

In this way, in another extended implementation scenario, the same user or another user may, for example, read a plurality of fabric files in the fabric database 622_2 through any electronic device, for example, to perform online fabric management or online fabric selection operations. In this regard, the cloud server 620 may also include 3D model modeling software. The user may connect to the cloud server 620 by operating specific software or a web interface through any electronic device, and the cloud server 620 may execute three-dimensional model modeling software. Next, the three-dimensional model modeling software may perform three-dimensional model modeling according to the normal map and roughness map in each fabric file to generate a simulated three-dimensional fabric model. In this way, the user may see a highly-simulated three-dimensional fabric model exhibiting near true colors through a display of any electronic device. Further, the three-dimensional fabric model may also allow the user to perform efficient and reliable online fabric management or online fabric selection operations through the matched corresponding fabric color information, fabric manufacturing information, and fabric weaving information.

Besides, sufficient teachings, suggestions, and implementation description related to the image processing operation and the file creation operation of this embodiment may be acquired with reference to the description of the embodiments of FIG. 1 to FIG. 5, and that repeated description is not provided hereinafter.

In view of the foregoing, in the fabric information digitization system and method thereof provided by the disclosure, after the two-dimensional image is obtained through the image capturing apparatus, the related digitalization information of the physical fabric is automatically generated through the computing apparatus, and the file creation operation of the digitalization information of the fabric is thereby automatically implemented. More importantly, in the fabric information digitization system and method thereof provided by the disclosure, the two-dimensional fabric image may be easily obtained through the image capturing apparatus (e.g., flatbed scanner), and the related fabric digitalization information may then be automatically generated without the need for complex and expensive equipment and cumbersome processes. Therefore, the general textile manufacturers or general people may adopt the fabric information digitization system and method thereof provided by the disclosure to achieve a cost-effective, efficient, and reliable fabric information digitization result. Moreover, in the fabric information digitization system and method thereof provided by the disclosure, the normal map and the roughness map may be automatically generated according to the two-dimensional fabric image. Accordingly, the three-dimensional model modeling software generates a three-dimensional fabric model that may faithfully reflect the features of the physical fabric according to the normal map and the roughness map, and the three-dimensional fabric model may be further applied to, for example, online fabric management or online fabric selection operations. Therefore, the fabric information digitization system and method thereof provided by the disclosure may be suitable for implementing the back-end related applications of the textile industry digitization.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A fabric information digitization system, comprising:
   an image capturing apparatus, obtaining a fabric image; and
   a computing apparatus, coupled to the image capturing apparatus, comprising a processor, and the processor is configured to execute an image processing module,
   wherein the computing apparatus executes the image processing module to analyze the fabric image to obtain fabric classification information, and the computing apparatus inputs the fabric image to one of a plurality of neural network modules corresponding to different fabric classifications in the image processing module according to the fabric classification information to generate a normal map and a roughness map,
   wherein the computing apparatus integrates the fabric classification information, the normal map, and the roughness map to generate a fabric file,
   wherein the image processing module performs color transformation on the fabric image and inputs the color-transformed fabric image into a first generative adversarial network model and a second generative adversarial network model of one of the plurality of neural network modules, so that the first generative adversarial network model is outputted to the normal map, and the second generative adversarial network model is outputted to the roughness map.

2. The fabric information digitization system according to claim 1, wherein the image processing module further comprises a color analysis module, and the color analysis module is configured to analyze the fabric image to generate fabric color information, wherein the computing apparatus records the fabric color information into the fabric file.

3. The fabric information digitization system according to claim 2, wherein the color analysis module is configured to generate an overall color histogram, and the color analysis module determines a color number in the fabric color information of the fabric image according to at least one cluster peak of the overall color histogram.

4. The fabric information digitization system according to claim 1, wherein the image processing module further comprises a fabric classification module, and the fabric classification module is configured to analyze the fabric image to obtain the fabric classification information, wherein the fabric classification information comprises fabric manufacturing information and fabric weaving information.

5. The fabric information digitization system according to claim 4, wherein the fabric classification module comprises a support vector machine classification module.

6. The fabric information digitization system according to claim 1, wherein the image processing module comprises:
   a color hue transformation module, configured to transform the fabric image to generate a first color transformation image;
   a color cluster transformation module, configured to transform the fabric image to generate a second color transformation image; and
   a selection module, configured to compare two overall color histograms of the first color transformation image and the second color transformation image to select and input one of the two overall color histograms with a highest number of cluster peaks and/or a least number of cluster peaks to the first generative adversarial network model and the second generative adversarial network model of one of the plurality of neural network modules.

7. The fabric information digitization system according to claim 1, wherein the image processing module marks ruler information of the fabric image according to an image format, and the computing apparatus records the ruler information into the fabric file.

8. The fabric information digitization system according to claim 1, wherein the image processing module is further configured to recognize a text pattern in the fabric image to obtain corresponding text information, and the computing apparatus records the text information into the fabric file.

9. The fabric information digitization system according to claim 1, wherein the image capturing apparatus is a flatbed scanner, and the computing apparatus is a cloud server.

10. A fabric information digitization method, comprising:

obtaining, through an image capturing apparatus, a fabric image;

executing, through a processor of a computing apparatus, an image processing module to analyze the fabric image to obtain fabric classification information;

inputting, through the processor of the computing apparatus, the fabric image to one of a plurality of neural network modules corresponding to different fabric classifications in the image processing module according to the fabric classification information to generate a normal map and a roughness map; and integrating, through the processor of the computing apparatus, the fabric classification information, the normal map, and the roughness map to generate a fabric file, wherein the step of generating the normal map and the roughness map comprises:

executing, through the processor of the computing apparatus, the image processing module to perform color transformation on the fabric image and input the color-transformed fabric image into a first generative adversarial network model and a second generative adversarial network model of one of the plurality of neural network modules, so that the first generative adversarial network model is outputted to the normal map, and the second generative adversarial network model is outputted to the roughness map.

11. The fabric information digitization method according to claim 10, further comprising:

executing, through the processor of the computing apparatus, a color analysis module of the image processing module to analyze the fabric image to obtain fabric color information; and recording, through the processor of the computing apparatus, the fabric color information into the fabric file.

12. The fabric information digitization method according to claim 11, wherein the step of analyzing the fabric image to obtain the fabric color information comprises:

generating, through the color analysis module, an overall color histogram of the fabric image and determining a color number in the fabric color information of the fabric image according to at least one cluster peak of the overall color histogram.

13. The fabric information digitization method according to claim 10, wherein the step of obtaining the fabric classification information comprises:

executing, through the processor of the computing apparatus, a fabric classification module of the image processing module to analyze the fabric image to obtain the fabric classification information, wherein the fabric classification information comprises fabric manufacturing information and fabric weaving information.

14. The fabric information digitization method according to claim 13, wherein the fabric classification module comprises a support vector machine classification module.

15. The fabric information digitization method according to claim 10, wherein the step of performing color transformation on the fabric image and inputting the color-transformed fabric image into one of the plurality of neural network modules comprises:

executing, through the processor of the computing apparatus, a color hue transformation module of the image processing module to transform the fabric image to generate a first color transformation image;

executing, through the processor of the computing apparatus, a color cluster transformation module of the image processing module to transform the fabric image to generate a second color transformation image; and executing, through the computing apparatus, a selection module of the image processing module to compare two overall color histograms of the first color transformation image and the second color transformation image to select and input one of the two overall color histograms with a highest number of cluster peaks and/or a least number of cluster peaks to the first generative adversarial network model and the second generative adversarial network model of one of the plurality of neural network modules.

16. The fabric information digitization method according to claim 10, further comprising:

executing, through the processor of the computing apparatus, the image processing module to mark ruler information of the fabric image according to an image format; and recording, through the processor of the computing apparatus, the ruler information into the fabric file.

17. The fabric information digitization method according to claim 10, further comprising:

executing, through the processor of the computing apparatus, the image processing module to recognize a text pattern in the fabric image to obtain corresponding text information; and recording, through the processor of the computing apparatus, the text information into the fabric file.

18. The fabric information digitization method according to claim 10, wherein the image capturing apparatus is a flatbed scanner, and the computing apparatus is a cloud server.

* * * * *